United States Patent
Vaish et al.

(10) Patent No.: US 10,878,395 B2
(45) Date of Patent: Dec. 29, 2020

(54) OPEN PAYMENT NETWORK

(71) Applicant: Blackhawk Network, Inc., Pleasanton, CA (US)

(72) Inventors: Tushar Vaish, Milpitas, CA (US); Tomas Campos, Berkeley, CA (US); Mike Gionfriddo, Pleasanton, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 836 days.

(21) Appl. No.: 14/911,691

(22) PCT Filed: Aug. 13, 2014

(86) PCT No.: PCT/US2014/050967
§ 371 (c)(1),
(2) Date: Feb. 11, 2016

(87) PCT Pub. No.: WO2015/023800
PCT Pub. Date: Feb. 19, 2015

(65) Prior Publication Data
US 2016/0210605 A1 Jul. 21, 2016

Related U.S. Application Data

(60) Provisional application No. 61/865,533, filed on Aug. 13, 2013.

(51) Int. Cl.
*G06Q 20/20* (2012.01)
*G06Q 20/36* (2012.01)
(Continued)

(52) U.S. Cl.
CPC ......... *G06Q 20/204* (2013.01); *G06Q 20/085* (2013.01); *G06Q 20/12* (2013.01); *G06Q 20/36* (2013.01)

(58) Field of Classification Search
None
See application file for complete search history.

(56) References Cited

U.S. PATENT DOCUMENTS

2012/0123841 A1* 5/2012 Taveau ................... G06Q 20/10
705/14.23
2012/0123935 A1* 5/2012 Brudnicki ............ G06Q 20/405
705/41

(Continued)

FOREIGN PATENT DOCUMENTS

WO  2015023800 A1  2/2015

OTHER PUBLICATIONS

Cover sheet and specification for provisional patent application entitled "Open Wallet Payment Network," by Tushar Vaish, et al., filed on Aug. 13, 2013 as U.S. Appl. No. 61/865,533.

(Continued)

*Primary Examiner* — Scott A Zare
(74) *Attorney, Agent, or Firm* — Jerry C. Harris, Jr.

(57) ABSTRACT

Systems and methods discussed herein relate to an Open Payment Network that allows a plurality of retailers to provide goods and services to users of applications including e-wallets and allows the users to pay for purchases using currency including digital currency earned as credits, points, or other rewards as well as traditional bank-backed currency in the form of cash, credit, or debit. In addition, a user who has registered for the system through a profile or using an individual application or applications can query the system and obtain a quote to determine how much value currency from a variety of sources (e.g., applications) has towards the purchase of a particular good or service at a real or virtual retail location.

19 Claims, 3 Drawing Sheets

(51) Int. Cl.
*G06Q 20/12* (2012.01)
*G06Q 20/08* (2012.01)

(56) References Cited

U.S. PATENT DOCUMENTS

| | | | | |
|---|---|---|---|---|
| 2013/0073459 A1* | 3/2013 | Zacarias | ................ | G06Q 20/36 705/41 |
| 2013/0246261 A1* | 9/2013 | Purves | ................ | G06Q 20/105 705/41 |
| 2013/0282588 A1* | 10/2013 | Hruska | ................ | G06Q 20/10 705/67 |
| 2014/0019352 A1* | 1/2014 | Shrivastava | ....... | G06Q 20/3674 705/41 |
| 2014/0058937 A1* | 2/2014 | Watson | .............. | G06Q 20/4012 705/41 |
| 2015/0254698 A1* | 9/2015 | Bondesen | .......... | G06Q 30/0215 705/14.17 |

OTHER PUBLICATIONS

Filing receipt and specification for International application entitled "Open Payment Network," filed Aug. 13, 2014 as International application No. PCT/US2014/050967.

\* cited by examiner

OPEN PAYMENT NETWORK

CROSS-REFERENCE TO RELATED APPLICATIONS

This application is a filing under 35 U.S.C. 371 of International Application No. PCT/US2014/050967 filed Aug. 13, 2014, entitled "Open Payment Network," which claims priority to U.S. Provisional Patent Application No. 61/865,533 filed Aug. 13, 2013, which applications are incorporated by reference herein in their entirety.

BACKGROUND

Electronic payments including digital wallets are becoming increasingly popular and may employ a variety of payment methods. These payment methods allow users to make purchases by linking various accounts and cards to a central location to allow users to make payments at point of sale locations.

SUMMARY

In an embodiment, a method comprising: receiving, by a point of sale, a transaction request for at least one good or service, wherein the transaction request comprises a first requestor identifier and a second requestor identifier; sending, by the point of sale, to a transaction processing platform, a request comprising the first requestor identifier, the second requestor identifier, and a point of sale identifier; receiving, by the point of sale, a response to the request, wherein the response to the request is based on a determination that the first requestor identifier, the second requestor identifier, and a point of sale identifier correspond to a plurality of information retrieved by the transaction processing platform and associated with the at least one requestor identifier and the point of sale identifier, wherein the second requestor identifier was associated with the first requestor identifier prior to the point of sale receiving the transaction request; and completing, by the point of sale, in response to receiving the response to the request, the transaction request based upon the determination.

In an embodiment, a system comprising: a point of sale; a computer system comprising a memory and a plurality of data stores; an application on a server and executed by processor stored in the memory, wherein the application: receives a transaction request, wherein the transaction request is received from the point of sale and wherein the transaction request comprises a first requestor identifier, a second requestor identifier, and a point of sale identifier; retrieves information from at least one of the plurality of data stores; determines if the received first requestor identifier and the second requestor identifier correspond to the retrieved information; determines if the received point of sale identifier corresponds to the retrieved information associated with the point of sale; sends a message to the point of sale in response to a determination that the received first requestor identifier and the second requestor identifier correspond to the retrieved information and a determination that the received point of sale identifier corresponds to the retrieved information associated with the point of sale.

In an alternate embodiment, a system comprising: a computer system comprising a memory and a plurality of data stores, wherein the computer system is networked with a plurality of merchant systems and a plurality of applications; a first application associated with a first application provider; a second application associated with the computer system and on a server and executed by processor stored in the memory, wherein the second application and the computer system are owned by a second application provider, wherein the first application and the second application are electronically connected via a network connection, and wherein the second application: receives a transaction request, wherein the transaction request includes transaction information comprising a user identifier associated with a requestor, a first application identifier associated with the first application provider, and a merchant identifier associated with a first merchant; determines if there is conversion information associated with the first application identifier and the first merchant in the plurality of data store based on information associated with the first application identifier and the first merchant; and sends a response message to the transaction request, wherein the first application provider, the second application provider, and the first merchant are different entities.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
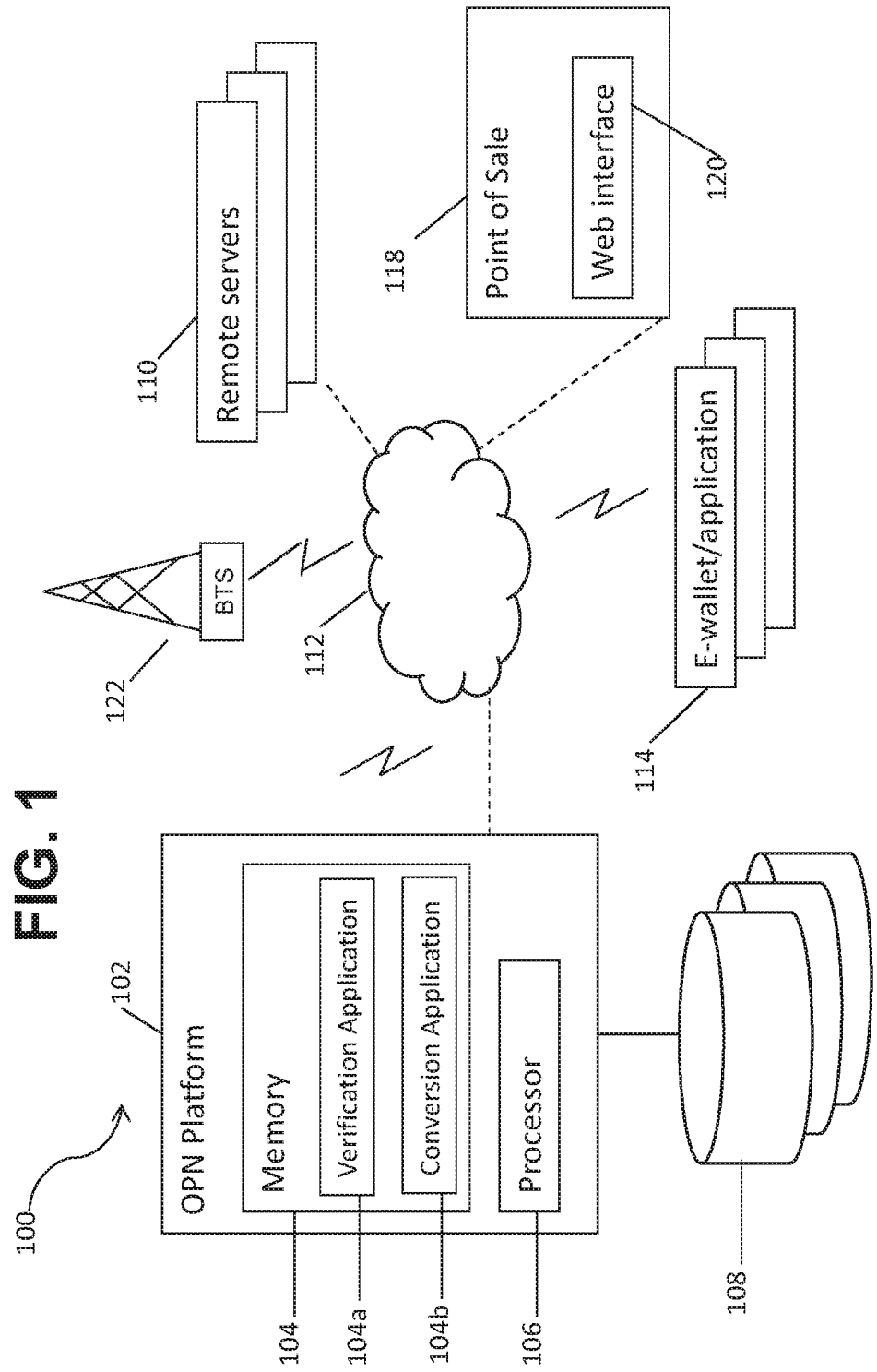
FIG. 1 is an illustration of a system that may be capable of executing according to certain embodiments of the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Digital wallets (e-wallets) may replace their physical counterpart but may struggle with mainstream adoption because, for example, there may be limited retail locations where a digital wallet can be used as a payment instrument. For example, a digital wallet may be an electronically maintained data file which may comprise authentication information, rules for use, sub-wallets (e.g., for separately maintaining credit card-related information, debit card related-information, stored-value card-related information, loyalty program-related information, and reward program-related information), and electronica value tokens (e.g., electronic representations of the currency and/or other value associated with credit card-related information, debit card related-information, stored-value card-related information, loyalty program-related information, and reward program-related information contained in the e-wallet/sub-wallet). In certain embodiments, a user may create a digital wallet, establish rules for the digital wallet, provision the digital wallet, and access the digital wallet to facilitate electronic transactions.

Every digital wallet provider may try to create its own retail acceptance network by directly integrating with the retailer's point of sale. In addition, various application developers and providers (e.g., retailers) may want their users to be incentivized to download and use applications by offering both in-application ("in-app") purchases using in-app earned credits alone or in combination with other currency, for example, currency earned through other applications, rewards programs, or cash/credit from an account at a financial institution. In some embodiments, the application developers and/or providers may also desire to incentivize their users to engage with the applications by allowing the in-app earned credits to be used at other retailers or in other applications. Therefore, most retailers may need to upgrade their point-of-sale system and/or backend infrastructure to support a new digital wallet provider or new application. This upgrade requirement may be a high barrier to entry for any wallet provider due to at least the time and capital involved. In addition, there are currently no standards for integration with a wallet provider as each wallet provider defines its own interface. The retailers may also struggle with settlement and reconciliation with digital wallet providers as each defines their own process for and structure of fee payments. Due to these challenging barriers of entry, traditionally, only major wallet providers can play in this space as it requires significant investments of both time and capital to motivate a change in point-of-sale, settlement, and reconciliation procedures for retailers. Both e-wallets and applications that otherwise allow for the accumulation and use of credits, rewards, loyalty points, cash, and other currency including digital currency may be referred to herein and may be collectively and generally referred to herein as "applications" and may including gaming applications, finance applications, vendor-specific applications, health and fitness applications, and social media applications.

Systems and methods discussed herein describe certain embodiments of an Open Payment Network (OPN) which (1) allow a wide scope of retailers from big-box to couture to small businesses to accept payment from a plurality of sources/applications including but not limited to e-wallets that employ a variety of currency types, (2) allow a user, via an application, to pay with a variety of both U.S. government-issued, foreign-government-issued, in-application earned and other digital currency, bank-issued, and brand-related currency, (3) allow for fee collection from either the point of sale or the e-wallet, (4) allow a user to query and value (e.g., convert currency) a plurality of currencies from a plurality of currency sources and determine how much value currency from different sources has towards the purchase of a good or service at a particular vendor, and (5) secure the transaction between the point-of-sale (POS) terminal and the application through the third party Open Payment Network (OPN) which may also be referred to as a verification platform or verification network.

In this embodiment, the vendor (e.g., via a POS) and the e-wallet or other application may not utilize a plurality of interfaces and applications to communicate. Rather, they communicate through the OPN platform and therefore may not need to comprise a plurality of interfaces, applications, and protocol in order to complete transactions with a plurality of e-wallet/application types (from the POS perspective) or at a plurality of POS locations (from the e-wallet/customer perspective). The e-wallet or other currency-accumulating and/or currency-storing application discussed herein may be in the form of a digital wallet stored on a portable communication device including mobile phones, multi-functional devices, tablets, laptops, and personal digital assistants (PDA). Access to the electronic wallet may be gated or protected by an authentication token or other means for securely accessing an electronic wallet, examples of which include a proxy card or a personal digital assistant or mobile device such as a smart phone. Other embodiments for access to the electronic wallet include cardless access such as a number/password combination, a number without a password, and the like. Biometric information may also be used for authentication and access purposes, e.g. a fingerprint or iris print. Near field communication technology may also be used to implement authentication tokens. Near field communication technology may be implemented at a physical point of sale or in association with an online transaction. In either context, the near field communication technology may be implemented by a user via a proxy card, personal computer, personal digital assistant, smart phone 204, or other online transaction-related device. Thus, the authentication token may be tangible, intangible, or a combination thereof. In an embodiment, the authentication token may be generated, created, and/or formed at the initiation of an electronic transaction to uniquely identify the electronic transaction. In an embodiment, the uniquely generated authentication token may comprise elements of an electronic wallet identifier, a merchant identifier, a point of sale identifier, an electronic value token identifier, an electronic value token issuer identifier, an electronic value token transaction processor identifier, or combinations thereof. In another embodiment, the uniquely generated authentication token may be wholly unique and not comprise any portion of any previous identifier.

In certain embodiments, the e-wallet discussed herein may be accessed through a fob or other device, or may be accessed through a keypad entry, image verification, near-field communication, infrared communication, at least one biometric indication, voice activation, mnemonic transfer, or combinations thereof. In an embodiment where an application other than an e-wallet is employed, this application may be accessed by way of a portable, semi-portable, or stationary (desktop or kiosk) device.

In some embodiments, a beacon system may be employed at the POS wherein the ewallet may receive a signal from the POS that enables it to convert some or all of the currency from various currency sources in the e-wallet to a currency accepted at the POS so that the customer knows what they have to spend in the store. The beacon may also communicate deals, offers, rebates, coupons, and other rewards available in the retail location and/or in affiliated locations. This beacon may be, for example, an indoor proximity system that enables applications stored on devices to take various actions such as making transaction requests, purchase requests, and to receive offer and discount information when a device is in proximity of the beacon. The beacon may use Bluetooth Low Energy proximity sensing to determine the location of a device in proximity to the beacon and/or to engage in communication with a device via an application stored on or accessed using the device or with the operating system of the device itself In one example, a customer may have a device that comprises a plurality of applications including an application for a clothing retailer. If the customer is at a shopping mall and comes within a predetermined proximity of a beacon, the beacon may transmit, for example using Bluetooth Low Energy technology, a universally unique identifier to a particular application on the device or by way of the device's operating system. This identifier may be used to, in response to a determination that the user is within a predetermined proximity of the beacon, transmit an offer, reward, coupon, sale information, or other information that may encourage the user to visit the store in person or online, as some offers may be virtually redeemable. In some embodiments, the beacon may enable or facilitate communications between the OPN platform and e-wallets or other applications registered with the OPN platform. The following patents are incorporated by reference in their entirety herein: U.S. Pat. No. 8,718,620, "Personal Media Devices with Wireless Communication," filed Nov. 13, 2006; U.S. Pat. No. 8,718,021, "Uplink Control Signal Design for Wireless System," filed Jul. 6, 2010; U.S. Pat. No. 8,717,998, "Apparatus and Methods for Transmission and Reception of Data in Multi-Antenna Systems," filed Apr. 9, 2012; U.S. Pat. No. 8,718,644, "Automatically Modifying Wireless Network Connection Policies Based on User Activity Levels," filed Aug. 30, 2012; U.S. Pat. No. 8,717,305, "Touch Event Model for Web Pages," filed Mar. 4, 2008; U.S. Pat. No. 8,718,713, "Transmission Method and Related base station," filed Sep. 27, 2012; U.S. Pat. No. 8,717,657, "Wireless Communication Systems and Method," filed May 27, 2011; U.S. Pat. No. 8,719,091 "System, Method and Computer Program for Determining Tags to Insert in Communications," filed Oct. 10, 2008; U.S. Pat. No. 8,260,320, "Location Specific Content," filed Nov. 13, 2008; U.S. Pat. No. 8,073,984, "Communication Protocol for Use with Portable Electronic Devices," filed May 22, 2006; U.S. Pat. No. 8,630,662, "Location Specific Icons," filed Aug. 31, 2012; and U.S. Pat. No. RE 42,927, "System and Method for Obtaining and Using Location Specific Information," filed Sep. 1, 2010.

In an embodiment, the open payment network may comprise an independent organization with representation from digital wallet providers and retailers. An OPN platform can be configured to define specifications, standards, processes, mechanisms, or combinations thereof, including a point-of-sale and digital wallet provider specification/protocol to integrate the e-wallet or other application and the POS terminals with the OPN for real time payment transactions. In addition, the OPN may comprise reconciliation and settlement standards and processes for retailers and digital wallet providers as well as payment instrument acceptance mechanisms at a point-of-sale terminal.

In some embodiments, an OPN may integrate with a retailer's POS system(s) and may be route transactions to wallet providers. In some examples, an OPN may facilitate settlement and reconciliation with retailers and wallet providers. For example, the reconciliation and settlement pattern and process of an OPN may comprise reconciliation and settlement system and process of a traditional payment network, e.g. a major credit card company.

In certain embodiments, an OPN may comprise, for example, a payment instrument, which may be issued, in some embodiments, by a wallet provider in a digital format, such as QR Code, 1d/2d barcode, or combinations thereof, and transmitted electronically to a point-of-sale through barcode scanners, Bluetooth, infrared, near-field communications, or combinations thereof. The payment instrument may comprise a wallet identifier (e.g., issued by an OPN) and a user identifier (e.g., issued by a wallet provider), and a value associated to the payment instrument which, in embodiments, may be determined by the wallet provider. The value may comprise any form of currency, e.g., cash, points, credits, gift cards, prepaid cards, credit/debit cards, as well as digital currency including but not limited to ach and bitcoin, or combinations of various forms of currency and may be earned from a variety of currency sources by a variety of means including applications, social media, browsing activity, and purchasing activity. There may be a currency conversion system or unit, which may be the responsibility of the wallet provider and an exchange rate may be clearly communicated (e.g., via a user device) to the wallet user for each of the currency sources. The OPN may further comprise a mechanism by which reloading and balance-determining capabilities are part of the standard specifications and are implemented by all retailers.

A retailer/vendor identifier (which may be referred to herein as the POS identifier) may be issued by the OPN for each retailer (point of sale) as discussed herein. In an embodiment, the POS identifier may be assigned at a corporate level. In alternate embodiments, the POS identifier may be assigned by subsidiary, region, department, or by individual POS terminal locations. In an alternate embodiment, the assignment of a "POS identifier" actually comprises the assignment of a primary identifier and a plurality of sub-identifiers. For example, if a corporate entity registers for the OPN platform, if may be assigned a corporate identity identifier. Within that corporate entity, there may be individual geographic regions, business units, departments, store types, store target groups (e.g., children, teens, adults, discount buyers, luxury buyers, etc.), or other categories/subsections/or business entities that are assigned sub-identifiers. In that embodiment, the OPN platform may then not only store the association between the corporate entity and the corporate entity identifier, but also the association(s) of the corporate identity identifier with the sub-identifier(s). The assigned sub-identifiers may be assigned at any level including individual points of sale, to where there could be a plurality of sub-identifiers associated with a particular POS terminal (e.g., identifiers and sub-identifiers associated with the corporation, division, and department may all be associated with a POS terminal in addition to the sub-identifier associated with that terminal.

Depending upon the embodiment, some or all of the identifier and sub-identifier levels may be used for authentication when a transaction request (including but not limited to a purchase request) is made. As used herein, the term "POS identifier" may refer to a single identifier assigned by the OPN as well as to any combination of identifiers assigned to a retailer/vendor including but not limited to brands, individual geographic regions, business units, departments, store types (e.g., luxury, discount), store target customer groups, etc. In an embodiment, some identifier information, for example, regional data information may be used to determine reward offers as discussed herein. In one example, customers who have a history of purchases at a store or stores in northern regions may receive offers for winter sport equipment discounts, or may have discounts automatically applied to winter sports equipment. In another example, customers with a similar purchase history who are determined to be within a predetermined distance of a ski resort or resorts may receive offers, for example, in a printed or digital format, for a discount or other offer at a nearby ski resort.

In some embodiments, the POS identifier may be communicated to the wallet provider or application. The POS identifier may allow the wallet provider or application to apply offers and/or transactions in real time. In some embodiments, basket data may be part of a transaction completed using the OPN. Basket data may comprise product categories and related values including item cost, number purchased, products browsed (if, for example, scanned by the mobile device comprising the e-wallet or other application), frequency of purchase, sale or full priced item, etc. This basket data may be communicated by the e-wallet or other application to the OPN platform at the POS terminal and may be employed by the e-wallet or other application and/or the OPN platform to determine any rewards that the user may be eligible for and communicate this information to the POS terminal. In various embodiments, the basket data may not include individual line items. The basket data may allow the wallet provider to apply offers and/or transactions real time. In embodiments, the retailer identifier in combination with the basket data may allow the wallet provider to apply offers and/or transactions real time.

In certain embodiments, the click fee, which may be referred to herein simply as a "fee" or a "transaction fee" is a flat fee per transaction that is unrelated to the amount of the transaction if it is a purchase transaction. If a transaction request is not for a purchase but is instead for a balance inquiry or conversion inquiry, a flat fee or a scaled fee based upon purchase/activity history may be applied. In some embodiments, the click fee is a low fee that may flow from a retailer to an OPN, and in other embodiments part of the fee may be collected by the e-wallet or other application provider. This fee may be a percentage of what is purchased, a flat fee, a fee that decreases with the frequency of use or of use for purchase of the e-wallet or application, or combinations thereof.

In alternate embodiments, the click fee may not be shared with the e-wallet or other application provider. Without receiving the click fee, or a portion thereof, the wallet provider may not make money on every transaction, and instead, the wallet provider may use transaction data to provide value-added services to a user and a retailer for profit. The OPN system is designed to enable (1) retailers to have cost savings due to flat low fees, (2) users to benefit from diverse wallet provider options, and (3) wallet providers to profit by providing value added services (e.g., most relevant offers based on transaction data) to retailers. For example, a wallet provider may determine that a particular user has earned a coupon, discount, rebate, or other reward at a particular brand or retailer. When the customer makes a future purchase of that brand or from that retailer, the e-wallet or other application may communicate that reward to the POS so that the discount may be applied. In alternate embodiments, the OPN system may determine, based upon the basket data associated with an e-wallet or other application identifier assigned by the OPN system, that the e-wallet or other application user has earned a reward or may be encouraged to continue patronizing a particular brand or retailer and this reward may be applied by the OPN system and communicated to the POS terminal during the verification process.

In an embodiment, a customer who uses an e-wallet or other application is issued a unique identifier which may be referred to as a first identifier. The customer may register for the OPN and is issued an identifier that may be referred to as a second identifier that the OPN associates with the e-wallet of that customer by storing the association in a data store. A plurality of vendors who may be referred to as points of sale (POS) may also register for the OPN and the OPN, for example by means of an application, may assign each vendor of the plurality of vendors a unique identifier and store this association in a data store. In an embodiment, there may be a different second identifier assigned to each first identifier, that is, a single user may register a plurality of applications and/or an e-wallet and receive a unique second identifier for each. In an alternate embodiment, a single user may register for an OPN profile. The OPN profile may comprise the user's name, email address, social media contacts, phone numbers, physical address, hobbies, interests, purchase history, and other information including clothing sizes and vacation preferences, some of this information may be employed to make offers and/or apply discounts/coupons/rewards as discussed herein. The OPN profile may then be used by the user to register a plurality of applications, so that one unique identifier may be assigned to the OPN profile and associated with a plurality of application (including e-wallet) identifiers in that profile.

The e-wallet may store a plurality of currency information from currency sources such as cash in U.S. and international bank accounts (savings and checking), values associated with debit or pre-paid cards, gift cards, international currency, airline miles, frequent buyer points (points rewarded for actual purchases), customer loyalty points (points or store credit awarded for a number of a frequency of purchases during a predetermined period of time), points for activity on various social media outlets for particular vendors ("social media points"), as well as points and credits earned from activities associated with the requestor identifier that may be earned through various applications which may be on the same device or on a different device than the device comprising the e-wallet.

In one example, a customer earns airline miles, points on credit cards from two different banks, and frequent buyer points from a coffee shop chain. The customer's e-wallet either stores these values or is able to access these values when applications and/or remote servers are queried. The customer registers for the OPN system and receives a unique e-wallet identifier (a second identifier) that OPN stores and associates with the e-wallet identifier (the first identifier) assigned by the e-wallet provider. When the customer goes to a Big Box Store to make a purchase at a POS terminal, the purchase request may also comprise a currency conversion where the value of some or all of the airline miles, points on credit cards from two different banks, and frequent buyer points from a coffee shop chain are selected by the e-wallet user for redemption and converted to a currency recognized by the Big Box Store. This may allow a customer to use, for example, airline mile points to purchase household goods at the Big Box Store, if it determines that the Big Box Store recognizes those airlines miles as currency. Upon receiving the purchase request, the POS terminal may send a verification request to the OPN system platform along with a unique identifier associated with the POS terminal. This unique identifier may also be referred to as a POS identifier though, as discussed herein, may comprise more than one identifier depending upon the identifier assignment structure used by that entity.

The OPN platform may receive this request for verification and parse the (1) first identifier, (2) the second identifier, and (3) the POS identifier. The OPN platform may retrieve information from its own data stores to confirm the POS identifier and the second identifier and may addition to remote data stores in order to confirm the e-wallet identifier which may then be compared to the e-wallet identifier associated with the second identifier assigned by the OPN to that e-wallet. In an alternate embodiment, the OPN platform does not communicate with remote servers and instead pulls the comparison information from its own data stores.

Upon verifying that (1) the second identifier was assigned to an e-wallet comprising the first identifier, and that (2) the POS identifier submitted by the POS corresponds to the identifier retrieved by the OPN platform, the OPN platform may send a notification to the POS terminal. In some embodiments, this notification may trigger (1) the completion of the purchase using at least some of the currency stored in the e-wallet, and (2) a fee payment to the OPN for completion of the transaction. In an embodiment, the user may select to use some or all of the currency (or rather currency source combinations) from the initial currency conversion request, or may choose various combinations of currency after requesting a conversion to determine which currency sources are accepted at the POS and how much each of those currencies are worth. For example, a user may prefer to use points or credits from source X that may be accepted for 20 points/dollar at the retail location because not many retail locations accept credits from source X, but may decline to use points or credits accumulated through source Y because they only get 15 points/dollar at the Big Box Store and may get more at other locations. The fee payment may be send to the OPN platform by either the e-wallet provider, e-wallet user (i.e. from their account), or by the POS, depending upon the type of purchase, amount of purchase, frequency of purchase from the POS and/or other vendors with a particular product category (restaurants, entertainment, clothing, sporting goods, travel, etc.) or other vendors within a particular corporate structure.

In some embodiments, the valuation of currency, whether it is converted based upon a purchase request or another transaction request such as a balance inquiry or conversion inquiry, may be impacted by the context of the request. For example, currency may be worth more in a rural market than at a store of the same brand or brand family in a more densely populated market. In another example, currency may be worth more when a request/inquiry is made towards the end of ski season in a geographic region that has an active ski season than the currency would be worth at the beginning of ski season in the same location or from a non-mountainous/beach location. The OPN system including the profile may comprise a feature that allows for geo-location of a user, and in some embodiments this geo-location feature may already be present in applications on a user's device and may be accessed by the OPN system. In an alternate embodiment, currency may be given a higher value if the currency conversion request is related to an item that is associated with items that were previously reviewed/selected or those that are already in a user's virtual (or actual) shopping basket. For example, a user that has already selected coffee for purchase may be able to also purchase cream or coffee mugs using a smaller amount of currency than a user who has selected lettuce, and a user who may have already selected sneakers may be able to purchase socks using a smaller amount of currency than a user who has instead selected a beach ball.

FIG. 1 illustrates system 100 which may be capable of executing according to certain embodiments of the present disclosure. In an embodiment, system 100 comprises a server computer 102 which may be referred to as a transaction processing platform or the OPN platform, a plurality of remote servers 110, a network 112, a base station transceiver (BTS) 122, and a plurality of data stores 108 stored on the server computer 102. The server computer 102 comprises a processor 106 and a memory 104 that may store an application 104*a* that may be executable by the processor 106. The application 104*a* may be a single application or may, in some embodiments, represent a plurality of applications that retrieve information, analyze information, present information, and receive requests for verification. The plurality of data stores 108 may comprise a plurality of information about unique e-wallet ID identifiers assigned by the OPN platform 102, for example, by the application 104*a*. The information may comprise an association between an e-wallet identifier assigned by the e-wallet provider (the first identifier) and the identifier assigned by the OPN platform 102 (the second identifier). The plurality of data stores 108 may also comprise a plurality of information about unique identifiers assigned to vendors (POS) and a plurality of OPN profiles that allow users to associate multiple e-wallets and/or other applications 114 with a single OPN-issued identifier.

Turning back to the system 100, the plurality of remote servers 110 may be in communication with the server computer 102 and may be associated with various avenues for offers, discounts, coupons, rebates, or other rewards that may be applied to e-wallet purchases. In an embodiment, the application 104*a* receives a request for verification of an e-wallet/e-wallet user from the point of sale 118 which may be a physical point of sale terminal, or an electronic access point. This request for verification may comprise the first and the second identifiers as well as the identifier associated with the vendor that was assigned by the OPN platform 102 when the vendor (POS) registered with the network. The point of sale 118 may be a desktop computer, kiosk, or other device that may comprise a web interface 120 and/or compatible software to communicate with the server computer 102 at least by way of the network 112. The e-wallet or other application 114 may be stored a mobile phone, tablet, personal digital assistant (PDA), or other device including stationary devices such as desktops and kiosks. It is appreciated that the e-wallet or other application 114 may comprise a plurality of applications 114 that are capable of allowing a user to store, earn, and/or spend currency of various types including digital and government-issued.

In an embodiment, the OPN platform 102 will validate the formatting of a digital wallet transaction request (e.g., primary or sub-wallet request) received, e.g., from a POS or other transaction originating device/component/processor. In other words, OPN platform 102 will check the data fields in the request to confirm that the fields are populated with data and that the data is in the correct format (e.g., length, alphanumeric format). If the request is improperly formatted, the OPN platform 102 will reject the request, or in some embodiments may retrieve the proper format (e.g., from a format database) and modify the transaction request to comply with the proper format. The OPN platform 102 also performs various validation checks on the request. The OPN platform 102 verifies transaction information based on an analysis of several criteria, such as: 1) determining that the UPC code for the product is present in a database (e.g., such as an issuer's database) for the system 100; 2) determining that the value amount of the requested transaction corresponds to the customer's payment for the subject transaction request, e.g., whether the UPC information identifies the card as a $25.00 card and that the corresponding transaction request includes a $25.00 payment by the customer; 3) determining that the UPC information identifies the card as being a type of card available for processing by the requesting merchant; and 4) determining that the Bank Identification Number ("BIN") of the card (i.e., the first six digits of the card's identification number), which identifies the card issuer, corresponds to the UPC information identifying the card issuer.

The OPN platform 102 may also verify transactions based on other criteria such as transaction velocity (number/amount per unit time). For example, if a card processor is concerned that multiple void transactions are indicative of fraudulent activity, the card processor could ask that the system 100 monitor the number of void transactions requested and reject transactions from terminals that exceed a pre-selected amount of void transactions per unit time. Lastly, the OPN platform 102 may be configured to reject transaction requests in the event that the information received by the OPN platform 102 is unintelligible.

In other embodiments, the e-wallet or other application 114 may be indicated (identified/authenticated/verified) by the manual entry of at least the second identifier and in some embodiments of the first identifier and the second identifier. For example, in some embodiments, both the first and the second identifiers are submitted or read simultaneously and parsed so that the application 104a compares the entered second identifier to ensure that the same unique identifier is stored in the plurality of data stores 108 and then confirm that the first identifier submitted corresponds to the e-wallet identifier assigned by the e-wallet provider that is associated with the second identifier that was entered into and confirmed as existing in the OPN system. In other embodiments, this may be a two-step process where only the second identifier is employed, and a message may be sent back to the POS requesting the corresponding e-wallet identifier (first identifier) after the first identifier has been confirmed and in some cases after the POS identifier has been confirmed.

In some embodiments, the application 104a receives the verification request from the point of sale (POS) 118 and, in response to retrieving the request, either (1) determines if there is information in the plurality of data stores 108 corresponding to the first identifier submitted in the verification request, and then, in response to a determination that there is, compares this information's association with an e-wallet identifier to the first identifier and the second identifier or (2) determines if there is an e-wallet identifier (corresponding to the first identifier) stored in the plurality of data stores 108 and then, if there is, compares the OPN unique identifier assigned to that e-wallet identifier that corresponds to the second identifier submitted with the verification request. In either embodiment, the application 104a may also verify that the POS identifier submitted in the verification request corresponds to the information stored in the plurality of data stores 108 for the associated vendor, parent company, subsidiary, sister company, or other organization associated with the POS 118. It is appreciated that the POS identifier as discussed herein may comprise one or more identifier that may indicate various aspects of a business organization.

In response to a determination that the first and the second identifiers correspond to the assigned and stored information in the data stores 108, and that the POS 118 is recognized as an OPN member, a verification notification may be sent to the POS 118 by the application 104a. In some embodiments, this verification may include the sending of a fee from the POS 118 to the OPN platform 102. It is appreciated that more than one POS 118 may be associated with a unique identifier, and therefore the identifier would be unique to a chain, brand, or other business entity as opposed to a single location or single POS 118. This fee may be discounted based upon a number of e-wallet transactions made by the POS 118 and/or by other terminals within a particular aspect of business organization (division, department, store, brand, region, etc.). In one example, a reduced fee may be charged if the sale is for, in whole or in part, store-branded items.

In an embodiment, the verification request may be sent by the POS 118 in response to receiving a purchase request from the e-wallet or other application 114. The purchase request may comprise the first and the second identifier, and a conversion application 104b that may be stored in the memory 104 of the OPN platform 102 may, in response to a determination as to what POS 118 the purchase request is sent to or upon receiving a signal from the POS 118 or other device located in proximity to the e-wallet or other application 114 (for example, using a beacon), perform a currency conversion/analysis.

This currency analysis and/or conversion that may be performed by the conversion application 104b may also be triggered manually by a user or automatically in response to an application's receipt of an offer for purchase. In one example, user may inquire as to how much currency is available from an e-wallet or application 114, and/or how much currency is available from multiple e-wallet or other application sources 114. This inquiry may also comprise a request to convert the selected currency or currencies to another currency and/or to a currency used by a particular brand or store that may or may not be associated with one of the selected e-wallet or other application sources 114, or a request to determine how much of the selected currency or currencies (from the selected e-wallet or other application(s) 114) may be applied to a purchase in a particular store. In one example, this inquiry may ultimately indicate what value the holder's airline miles, credit cards, cash, debit cards, loyalty points, social media points, and other earned and accrued values stored in the e-wallet or other application 114 are worth at the POS 118.

In an embodiment, a user may have the option of setting an alert on the network through their OPN profile based upon the availability of a predetermined amount of a particular currency. For example, if a user wants to use airline miles to purchase a particular pair of shoes from a particular store that has registered for the OPN platform 102, but does not yet have enough miles, the user may set an alert either in the airline mile-accumulating application or on the OPN platform 102 through their OPN profile that will tell them either (1) when there are enough points for the purchase, or (2) when the item goes on sale, or (3) when the item goes on sale and as a result there are enough points available for the purchase.

In one example, a user may select a value from some or all of the currency sources (e-wallet or other applications 114) for conversion, and in another example, the user may select some or all of the currency sources and obtain a general conversion value in order to determine which currency sources and how much currency from each source they wish to use for the purchase. This enables the user to maximize the use of their earned and accrued points, cash, credit, and credits as well as other earned currency at a wider range of retail locations than may be possible using conventional e-wallet systems.

Turning back to the purchase request example, the OPN platform 102 may compare the received first, second, and POS identifiers to determine that the second identifier was assigned to an e-wallet comprising the first identifier and to confirm that the POS 118 is registered with the OPN platform 102. Upon successful verification, the OPN platform 102 may send a notification to the POS 118 and the completion of the purchase transaction including any application of a reward by the e-wallet or other application 114 or the OPN platform 102 may occur in response to or simultaneously with the notification being sent to the POS 118 along with the fee collection by the OPN platform 102.

Figure 2:
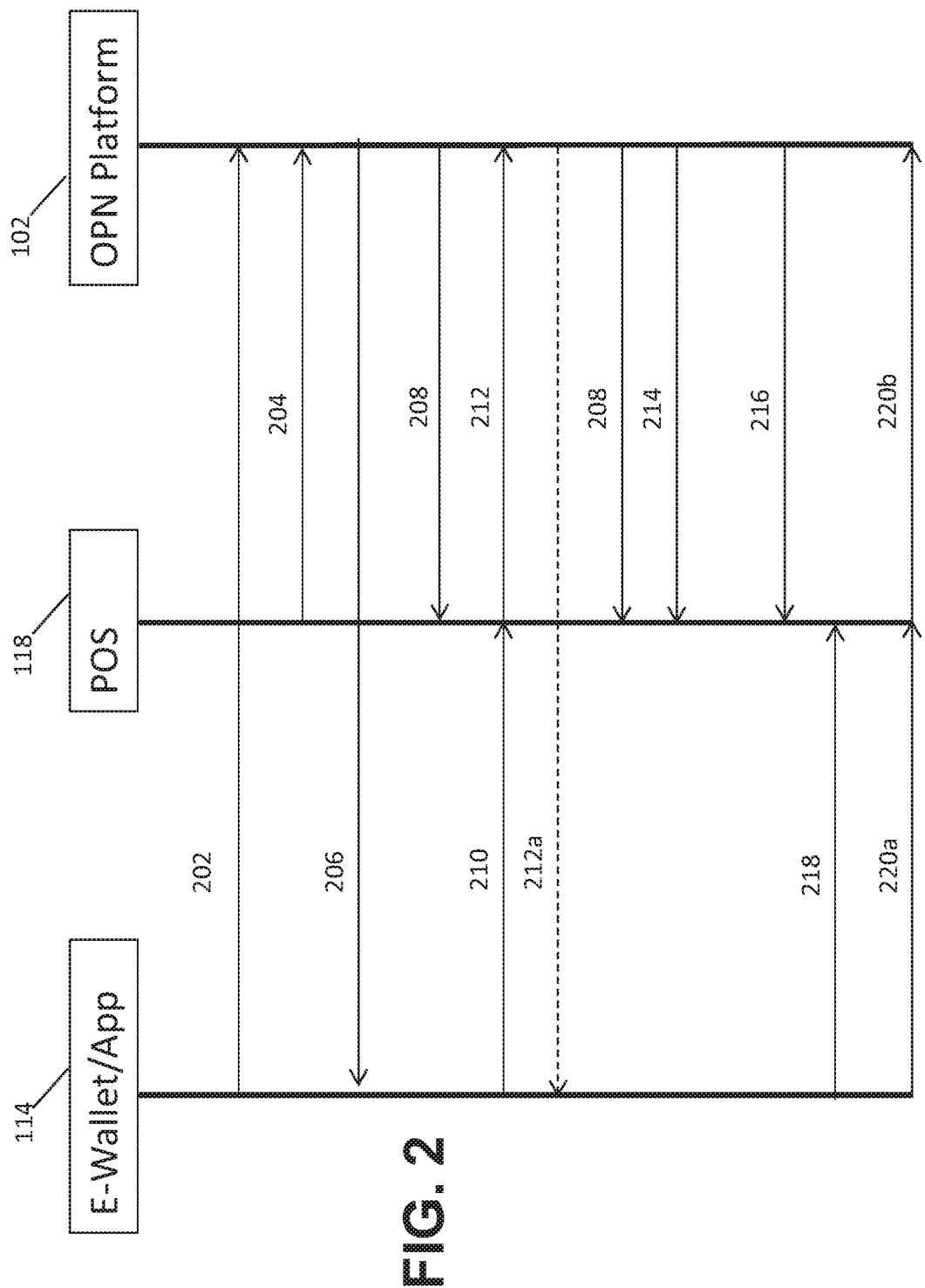
FIG. 2 is a flow diagram that illustrates a method of interacting with a payment system network according to certain embodiments of the present disclosure.

FIG. 2 is a flow diagram that illustrates a method of using currency to make a purchase according to certain embodiments of the present disclosure. FIG. 2 illustrates the e-wallet or other application 114, the POS 118, and the OPN platform 102 as shown in FIG. 1. The e-wallet or other application 114 may have been previously assigned a first identifier that may be associated with the e-wallet or other application provider, the telecommunications service provider that supports the device or devices comprising the e-wallet 114, or by a financial institution that supports the e-wallet provider.

At block 202, the e-wallet or other application 114 registers with the OPN platform 102 and receives a wallet/application identifier (also referred to as the second identifier) at block 206. In an embodiment, at block 202, a user may register for a profile on the OPN platform 102. The OPN profile may comprise a user's name, physical address, hobbies, interests, brand and store preferences, store radius preferences (for physical retail locations), preferred discount offers and coupon offers, email address, phone number(s), as well as at least one e-wallet or other application 114. The OPN profile is associated with the second identifier at block 206 and more than one application may be associated with this second identifier either at the time of registration at block 202 or over time. As this is a dynamic system, the OPN profile may be updated over time with browsing history, purchase history, as well as sale, discount, and earned credits/points/cash alerts as discussed herein.

The POS 118 registers for the OPN platform at block 204 and receives the POS identifier at block 208, this identifier may be associated with more than one POS terminal and may instead be associated with a specific store, vendor, brand, brand family, or shopping location. In an embodiment, an entity such as a shopping mall may register with the OPN platform 102 to allow its users to pay for things such as parking and vending at a plurality of locations around the shopping mall that may all be associated with a single POS identifier. In an alternate embodiment, a particular umbrella company that comprises multiple brands from luxury to bulk shopping may have multiple identifiers including sub-identifiers assigned to it because the amount and/or source fees associated with transactions at the different brand-specific locations may vary.

Turning again to FIG. 2, at block 210 the POS 118 receives a request for a purchase from the e-wallet or other application 114. Prior to sending the purchase request, or simultaneously with sending the request, the e-wallet may retrieve information from multiple sources to determine the amount of currency that can be used at the retail location of the POS 118. This calculation may request user input, i.e., which currency sources and/or how much from each currency source the user wishes to convert, or may be done automatically in response to sending the request, for example, by the mobile application 116 which may be part of the e-wallet or other application 114 as shown in FIG. 1.

In an alternate embodiment, the request sent at block 210 may not be for a purchase but may be for a transaction as discussed herein such as a balance inquiry, currency conversion request, currency conversion request associated with a particular purchase, or other request related to the use of the OPN platform 102. In that event, the request at block 210 may be sent directly to the OPN platform (not pictured) as a POS 118 may not be queried if, for example, the request is for a balance inquiry or a currency conversion. The request at block 210 may be made via an application/ewallet 114 that registered for the OPN at block 202. In alternate embodiments, the request may be made through a beacon (not pictured) as discussed herein and the beacon may be used for communications between the OPN platform 102 and the e-wallet/application 114.

The currency conversion may be performed by the conversion application 104b as discussed with respect to FIG. 1.

The standards, schemas, and/or formulas used for converting currency from each currency source may be based on a contractual agreement between the OPN platform 102 and each e-wallet or other application 114. This information may be updated on a periodic basis at predetermined intervals based upon the contractual agreement. Some conversions may be based on market exchange rates as dictated by the governments of various countries, this information may be queried by the OPN platform 102, for example, from the plurality of remote servers 110 using the network 112. In the embodiment where the request sent at block 210 was a transaction request other than a purchase request, the information requested may be sent to the e-wallet or other application 114 at block 212a, and the method may end there or may continue back to block 210 with another purchase or transaction request.

In alternate embodiments, a beacon system may be used whereupon a beacon coupled to or otherwise in communication with the POS 118 and the beacon may promote the currency conversion or may send offers, coupons, or discounts to the e-wallet or other application by either acting as a trigger for the e-wallet or other application to perform and display currency calculations or by asking the user of the e-wallet or other application if they would like to see some or all of their currency sources converted. It is appreciated that the systems described herein are dynamic systems, just as the OPN platform 102 is updated either manually, automatically, and/or according to a predetermined schedule with new POS and e-wallet or other application registrants, the e-wallet or other application may be updated as well in order to present the most current currency values/accruals from each of the currency sources.

At block 212, the POS 118 may send a verification request to the OPN platform 102 to verify the first and the second identifiers received in the purchase request sent at block 210. The verification request sent at block 212 may also comprise the POS identifier associated with the POS 118. The OPN platform 102 may then compare information stored in its data stores 108 as discussed herein with the information submitted (first identifier, second identifier, and POS identifier and or sub-identifiers) in the verification request at block 212. If at least one piece of information is not a match, the OPN platform 102 at block 214 may send back a notification that the verification failed, and POS 118 may send another request (not pictured). If the second request also fails, an alert may be generated by the OPN platform 102 (including by the application 104a) that the e-wallet or other application 114 and/or the POS 118 have failed to verify correctly and that one or both may be compromised. This alert may prevent or restrict (by currency/dollar value, location, etc.) transactions initiated and/or participated in by the e-wallet or other application 114 and/or POS 118 based upon the identifiers submitted.

If the first, second, and POS identifiers correspond to the information stored by the OPN platform 102, a message may alternatively be sent at block 216 to indicate a successful verification. At block 218, the transaction associated with the purchase request is completed when the e-wallet or other application 114 completes the transaction. At blocks 220a and/or 220b, a fee may be collected from at least the POS 118 and sent to the OPN platform 102. The amount and the source of the fee collected may be determined by contractual agreement between the e-wallet or other application provider and the owner of the vendor/brand/chain where the POS 118 is located and/or affiliated with. In an embodiment, the transaction completion at block 218 and the fee payment at blocks 220a and/or 220b are completed in response to receiving the verification at block 216, and are completed in a manner that is transparent to the user and in some embodiments instantaneously upon receipt of the verification at block 216. In alternate embodiments, there may be a step (not pictured here) after block 216 but before block 218 where the verification is also communicated to the e-wallet or other application 114.

Figure 3:
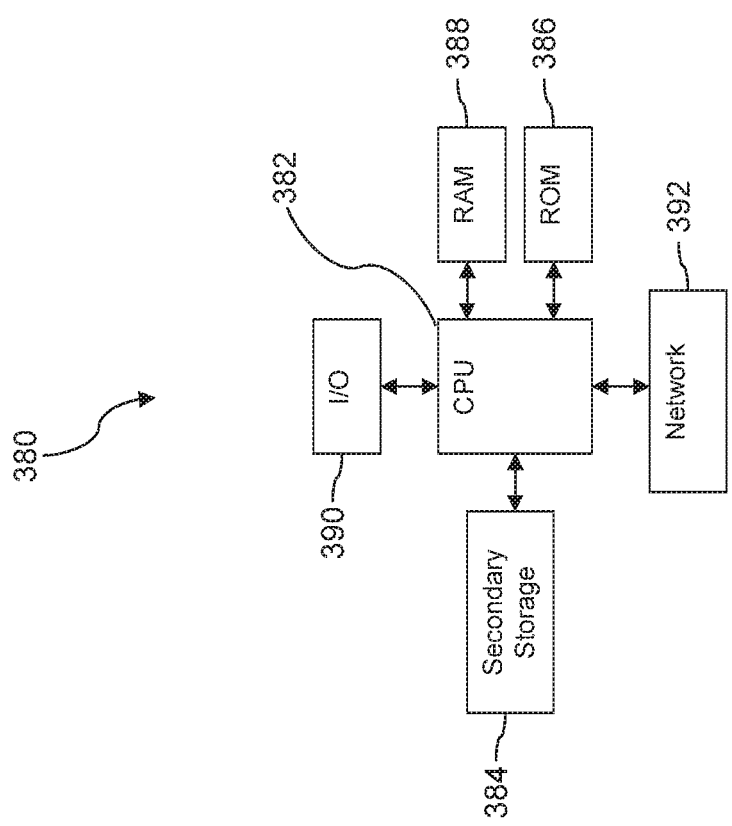
FIG. 3 is a block diagram of a computer system according to certain embodiments of the disclosure.

FIG. 3 illustrates a computer system 380 suitable for implementing one or more embodiments disclosed herein. For example, the method discussed above may be implemented in a form substantially similar to that of the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Embodiments of the OPN disclosed herein may be implemented on any particular machine or machines with sufficient processing power, memory resources, and network throughput capability to handle the necessary workload placed upon it.

All of, or a portion of, an OPN described herein may be implemented solely as hardware, solely as software, or as a combination of hardware and software on any particular machine, or machines, with sufficient processing power, memory resources, and throughput capability to handle the necessary workload placed upon the computer, or computers, for example, one or more computers including a processor (which may be referred to as a central processor unit or CPU) that is in communication with memory devices including secondary storage, read only memory (ROM), random access memory (RAM), input/output (I/O) devices, and network connectivity devices. The processor may be implemented as one or more CPU chips.

It is understood that by programming and/or loading executable instructions onto a computer, at least one of the CPU, the RAM, and the ROM are changed, transforming the computer in part into a particular machine or apparatus having the novel functionality taught by the present disclosure.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by a computer. In some contexts, the secondary storage, the ROM, and the RAM, etc. may be referred to as a non-transitory computer readable medium or a computer readable storage media.

Further aspects of the instantly disclosed methods and systems are provided in the following Examples.

Example 1

A computer-implemented method to transmit transaction information to value token issuers in digital wallet transactions, comprising: receiving, using one or more computing devices and from a merchant computing device associated with a merchant, a first transaction request to authorize a digital wallet transaction, the first transaction request identifying a value token of a user for conducting the transaction; selecting, using the one or more computer devices, at least one account associated with the value token for the transaction; determining, using the one or more computing devices, that the first transaction request is improperly formatted; modifying, using the one or more computing devices, the formatting of the first transaction request to a modified formatting in response to a determination that a transaction processing platform does not accept the formatting provided in the first transaction request; communicating, using the one or more computing devices, a second transaction request to perform the transaction to the transaction processing platform, the second transaction request comprising the modified formatting; receiving, using the one or more computing devices, a first confirmation message for the transaction from the transaction processing platform, confirming the transaction using the selected at least one account; and communicating, using the one or more computing devices, a second confirmation for the transaction to the merchant computing device in response to receiving the first confirmation for the transaction from the transaction processing platform, confirming the transaction using the selected value token.

Example 2

The computer-implemented method of Example 1, wherein the modifying step comprises: establishing, using the one or more computing devices, a database comprising a list of merchant transaction formats; determining the merchant associated with the transaction; and modifying the transaction format according to the transaction formatting associated with the merchant.

Example 3

The computer-implemented method of Example 1, wherein the modified transaction format corresponding to the merchant is provided by a transaction processing platform processor.

Example 4

The computer-implemented method of Example 1, wherein the determining step is performed by a transaction processing platform processor, wherein said determining comprises determining if the transaction fields are populated with data and that the data is in the correct format.

Example 5

The computer-implemented method of Example 1, further said determining comprises determining if a bank identification number (BIN) associated with the value token corresponds to UPC information provided with the transaction request.

Example 6

The computer-implemented method of Example 4, wherein the data includes identification of the merchant.

Example 7

A computer program product, comprising: a non-transitory computer-readable storage device having computer-readable program instructions embodied thereon that when executed by a computer perform a method to transmit transaction formatting to value token issuers in digital wallet transactions, the computer-readable program instructions comprising: computer program instructions to receive, from a merchant computing device associated with a merchant, a first transaction request to authorize a digital wallet transaction, the first transaction request identifying a value token of a user for payment of the transaction in a first transaction format; computer program instructions to select at least one account associated with the value token to fund the transaction; computer program instructions to determine that a transaction processing platform does not accept the transaction format provided in the first transaction request; computer program instructions to modify the transaction format to a modified format in response to a determination that the transaction processing platform does not accept the transaction format provided in the first transaction request, the modified format being associated with a transaction format utilized by the transaction processing platform; computer program instructions to communicate a second transaction request to perform the transaction to the transaction processing platform associated with the selected at least one account, the second transaction request comprising the modified format; computer program instructions to receive a confirmation for the transaction from the transaction processing platform confirming the transaction using the selected at least one account; and computer program instructions to communicate the confirmation to the merchant computing device.

Example 8

The computer program product of Example 7, wherein the modifying step comprises: computer program instructions to establish a database comprising a list of merchant transaction formats, computer program instructions for determining the merchant associated with the transaction, and modifying the transaction format according to the transaction formatting associated with the merchant.

Example 9

The computer program product of Example 7, wherein the modifying step comprises: computer program instructions to establish a database comprising a list of value token issuer transaction formats, computer program instructions for determining the issuer associated with the transaction, and modifying the transaction format according to the transaction formatting associated with the issuer.

Example 10

The computer program product of Example 7, wherein the determine step comprises computer program instructions to determine if the transaction fields are populated with data and that the data is in the correct format.

Example 11

The computer program product of Example 7, wherein the determine step comprises computer program instructions to determine if a bank identification number (BIN) associated with the value token corresponds to UPC information provided with the transaction request.

Example 12

The computer program product of Example 10, wherein the data includes identification of the merchant.

Example 13

A system to transmit transaction information to value token issuers in digital wallet transactions, the system comprising: a storage resource; a network module; and a processor communicatively coupled to the storage resource and the network module, wherein the processor executes application code instructions that are stored in the storage resource and that cause the system to: receive from a merchant computing device associated with a merchant, a first transaction request to conduct a digital wallet transaction, the first transaction request identifying a value token of a user for payment of the transaction and a first transaction format; select at least one account associated with the value token to fund the transaction; determine that a transaction processing platform does not accept the transaction format provided in the first transaction request; modify the transaction format to a modified transaction format in response to a determination that the transaction processing platform does not accept the transaction format provided in the first transaction request, the modified format being associated with a transaction format utilized by the transaction processing platform; communicate a second transaction request to perform the transaction to the transaction processing platform associated with the selected at least one account, the second transaction request comprising the modified transaction format; receive confirmation of the transaction from the transaction processing platform to fund the transaction using the selected at least one account; and communicate confirmation of the transaction to the merchant computing device in response to receiving the confirmation from the transaction processing platform.

Example 14

The system of Example 13, the instructions further comprising wherein the modifying step comprises: establishing, using the one or more computing devices, a database comprising a list of merchant transaction formats, determining the merchant associated with the transaction, and modifying the transaction format according to the transaction formatting associated with the merchant.

Example 15

The system of Example 13, wherein the modified transaction format corresponding to the merchant is provided by a transaction processing platform processor.

Example 16

The system of Example 13, wherein said determining comprises determining if the transaction fields are populated with data and that the data is in the correct format.

Example 17

The system of Example 13, wherein said determining comprises determining if a bank identification number (BIN) associated with the value token corresponds to UPC information provided with the transaction request.

Example 18

The system of Example 16, wherein the data includes identification of the merchant.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method comprising:
    receiving, by a point of sale, a transaction request for at least one good or service, wherein the transaction request comprises a first requestor identifier and a second requestor identifier, wherein the first requestor identifier is associated with a user;
    sending, by the point of sale, to a transaction processing platform, a request comprising the first requestor identifier, the second requestor identifier, and a point of sale identifier;
    receiving, by the point of sale, a response to the request, wherein the response to the request is based on a determination that the first requestor identifier, the second requestor identifier, and a point of sale identifier correspond to a plurality of information retrieved by the transaction processing platform and associated with at least one requestor identifier and the point of sale identifier, wherein the second requestor identifier is one of a plurality of second requestor identifiers which was issued by the transaction processing platform, wherein the plurality of second requestor identifiers is associated with the first requestor identifier prior to the point of sale receiving the transaction request, and wherein the plurality of second requestor identifiers identify certain applications, certain e-wallets, or combinations thereof; and
    completing, by the point of sale, in response to receiving the response to the request, the transaction request based upon the determination.

2. The method of claim 1, wherein the transaction request is one of a currency conversion request, a quotation for purchase, a request for purchase, a request for a balance, or combinations thereof.

3. The method of claim 2, wherein the transaction request comprises a request for currency conversion, wherein the request for currency conversion comprises an amount of currency and a request to convert that amount into a currency accepted by the point of sale.

4. The method of claim 3, wherein the amount of currency is indicated by at least one of an international currency, airline miles, digital currency, frequent buyer points, customer loyalty points, social media points, as well as points and credits earned from activities associated with the requestor identifier.

5. The method of claim 4, wherein the amount of currency comprises a first portion associated with a first vendor, wherein the first vendor is associated with the point of sale, and a second portion associated with a second vendor.

6. The method of claim 5, wherein the second vendor is not associated with the first vendor.

7. The method of claim 3, wherein the amount of currency is associated with a first vendor associated with but different from the second vendor associated with the point of sale, wherein the second vendor is at least one of a parent company, subsidiary, or sister company of the first vendor.

8. The method of claim 1, wherein the transaction request is received by the point of sale from a portable communication device.

9. The method of claim 1, wherein the point of sale identifier is associated with at least one of a point of sale terminal, a corporate entity, a geographic region, a business unit, a departments, a store type, a brand, a store target customer group, or combinations thereof.

10. The method of claim 1, wherein the transaction request is received by the point of sale from a card, fob, or keypad entry at the point of sale.

11. The method of claim 1, further comprising sending, by the point of sale, to the transaction processing platform, prior to completing the transaction request, and subsequent to receiving the response to the request, a fee.

12. The method of claim 1, further comprising the point of sale:
sending a fee to the transaction processing platform, wherein at least a portion of the fee is from a portable communication device.

13. The method of claim 1, wherein the transaction request is directed to a purchase transaction, a redemption transaction, a quote, a balance inquiry, a conversion value inquiry, or combinations thereof.

14. A system comprising:
a point of sale;
a computer system comprising a memory and a plurality of data stores;
an application on a transaction processing platform and executed by processor stored in the memory, wherein the application:
receives a transaction request, wherein the transaction request is received from the point of sale and wherein the transaction request comprises a first requestor identifier, a second requestor identifier, and a point of sale identifier, wherein the first requestor identifier is associated with a user, wherein the second requestor identifier is one of a plurality of second requestor identifiers which was issued by the transaction processing platform, wherein the plurality of second requestor identifiers is associated with the first requestor identifier, and wherein the plurality of second requestor identifiers identify certain applications, certain e-wallets, or combinations thereof;
retrieves information from at least one of the plurality of data stores;
determines if the received first requestor identifier and the second requestor identifier correspond to the retrieved information;
determines if the received point of sale identifier corresponds to the retrieved information associated with the point of sale;
sends a message to the point of sale in response to a determination that the received first requestor identifier and the second requestor identifier correspond to the retrieved information and a determination that the received point of sale identifier corresponds to the retrieved information associated with the point of sale.

15. The system of claim 14, wherein the first requestor identifier comprises a requestor device identifier or an application identifier and wherein the transaction request further comprises a request for currency conversion, wherein the request for currency conversion comprises an amount of currency associated with the requestor device identifier or the application identifier and a request to convert that amount into a currency accepted by the point of sale, wherein completing the transaction request comprises using at least a portion of the amount associated with the requestor device identifier or the application identifier.

16. The system of claim 15, wherein the amount associated with the requestor device identifier or the application identifier is indicated by at least one of an international currency, digital currency, airline miles, frequent buyer points, customer loyalty points, social media points, as well as points and credits earned from activities associated with the requestor device identifier or the application identifier.

17. The system of claim 15, wherein the amount associated with the requestor device identifier or the application identifier comprises a first portion associated with a first vendor associated with the point of sale and a second portion associated with a second vendor.

18. The system of claim 15, wherein the amount associated with the requestor device identifier or the application identifier is associated with a vendor other than a vendor associated with the point of sale.

19. The system of claim 15, wherein the amount associated with the requestor device identifier or the application identifier is associated with a first vendor associated with but different from the second vendor associated with the point of sale, wherein the second vendor is at least one of a parent company, subsidiary, or sister company of the first vendor.

* * * * *